Jan. 7, 1947. P. ROSA 2,413,997
PLUMBER'S TOOL
Filed Sept. 21, 1945
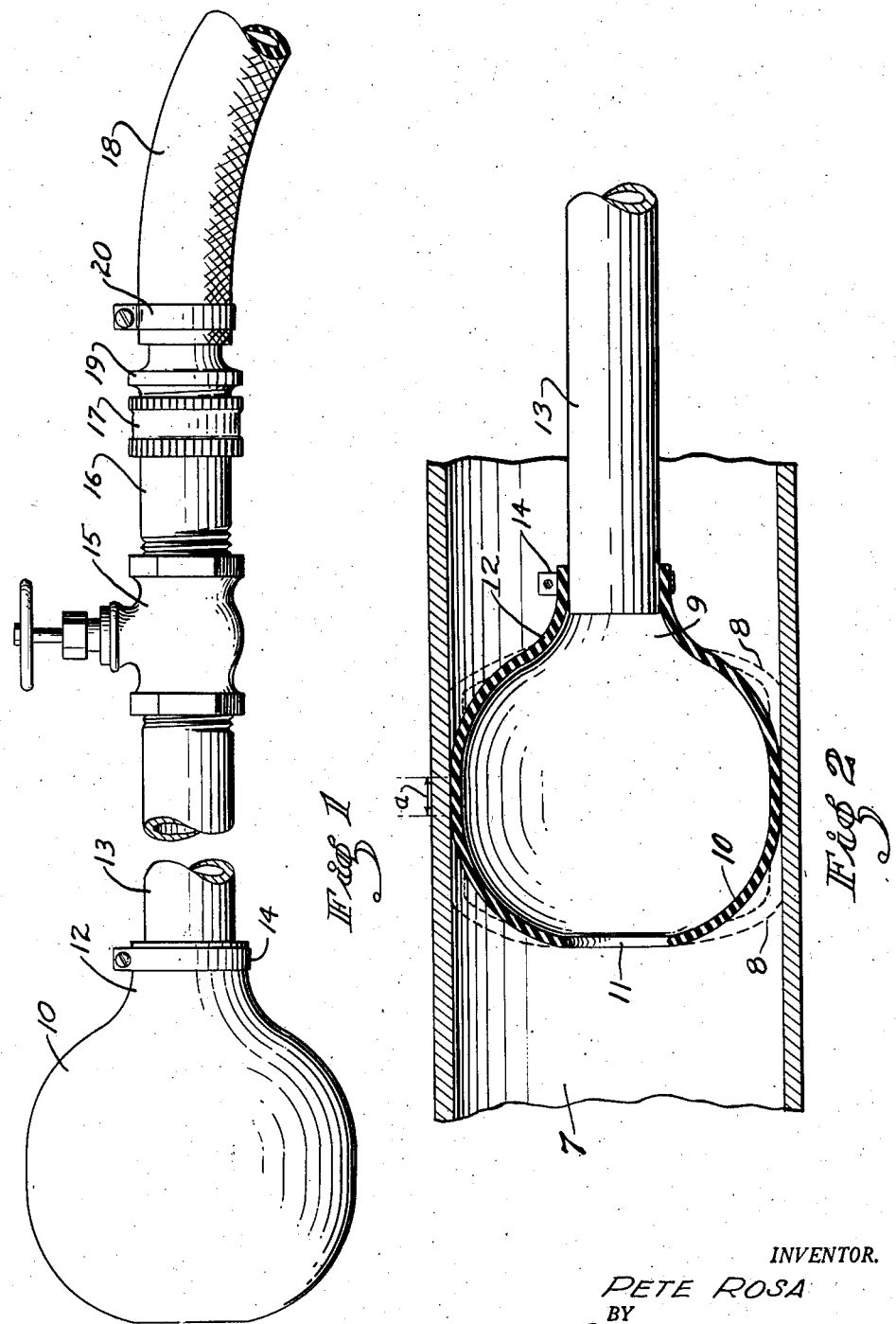
INVENTOR.
PETE ROSA
BY
Charles M Fryer
ATTORNEY.

Patented Jan. 7, 1947

2,413,997

UNITED STATES PATENT OFFICE 2,413,997

PLUMBER'S TOOL

Pete Rosa, Oakland, Calif.

Application September 21, 1945, Serial No. 617,843

1 Claim. (Cl. 15—104.05)

The present invention relates to plumber's tools and more particularly to a device to be used in cleaning stoppages in pipes or the like by the application of fluid pressure.

Waste pipes and sewers and the like often become filled with solid or semi-solid material which causes a stoppage of normal flow through the pipe but which can be dislodged and cleared by the application of pressure followed by a flow of clear water through the pipe. The most convenient source of fluid under pressure is usually a fresh water line to which an ordinary half or three-quarter inch garden hose may be connected. It is not, however, convenient to make a connection between such hose and the larger size pipes used for waste lines. It is to a device for making the latter connection that the present invention is directed.

It is an object of the present invention to provide an improved device for clearing waste lines and to provide a device having improved means for forming a quick and simple connection with a waste line, such connection being capable of forming a perfect seal and withstanding pressure. Further and more specific objects and advantages of the invention are made apparent in the following specification wherein reference is made to the accompanying drawing.

In the drawing:

Fig. 1 is a view in side elevation of a device embodying my invention; and

Fig. 2 is a similar view of a portion of the device shown in Fig. 1 with a part shown in section and illustrated as disposed inside a pipe.

The invention as shown in the drawing comprises a resilient hollow bulbous member 10 which may be made of rubber or similar material and which, for reasons presently to be made apparent, is of substantially spherical but slightly elongated shape. At one end the bulblike member 10 is provided with a discharge opening 11 and diametrically opposite such opening there is provided an inlet opening 9 surrounded by a neck portion 12 formed integrally with the member 10 in order that it may be secured to one end of a piece of pipe 13. A clamp 14 or other conventional means may be employed for securing the bulblike member 10 to the pipe 13. A valve 15 is connected with the opposite end of the pipe 13 to control the flow of water therethrough and a hose adapter, which comprises a nipple 16 and the female portion 17 of a standard hose coupling, is employed to form a connection between the valve and a length of standard garden hose 18 which includes a conventional male hose coupler member 19 secured in place by a clamp 20. The opposite end of the length of hose 18 which is not shown is adapted to be connected with a water tap so that water under pressure may be supplied through the pipe 13 and bulblike member 10 under control of the valve 15.

The bulblike member 10 is of a size to fit snugly within a waste line as a standard size of waste pipe 7 and when it is designed for use with the standard four inch pipe it will also fit into the trap portion of a toilet bowl where stoppages frequently occur. The pipe 13 may be of any length but preferably of two and a half or three feet so that it provides a convenient handle for manipulating the bulblike portion 10 and as the valve 15 is positioned directly adjacent the end of this handle, it is in the most convenient position to control the flow of water through the device and to provide either a steady or an intermittent flow as required.

In operation of the device, when a stoppage occurs in a pipe, the hose 18 is connected to a convenient outlet and the bulblike portion 10 is inserted into the toilet bowl or portion of the pipe behind the stoppage after the pipe has been made accessible by removal of a cleanout plug or by removing a convenient joint or the like. The diameter of the bulb 10 is such that it provides a snug but slidable fit against the inner wall of the pipe and a fluid tight seal is formed between the exterior of the bulb and the interior of the pipe wall by virtue of two structural features of the bulb. One of these features is the size of the opening 11 which is considerably smaller than the diameter of the bulb but slightly larger than the internal diameter of the pipe 13 through which the water under pressure is supplied. Consequently, the water may flow through the bulb rapidly. Because of the spherical shape of the bulb and the small diameter of the outlet opening 11, a slight pressure will be exerted within the bulb which will tend to distend its walls. The second feature is that the bulb is slightly elongated in shape so that it has a central portion of substantial width contacting the inner wall of the pipe which is shown at 7 in Fig. 2. The width of such central portion which normally contacts the pipe is indicated in Fig. 2 by the arrow $a$. Consequently, as the result of even a slight pressure tending to distend the walls of the bulblike member 10, two sections of the bulb adjacent opposite ends of the central portion which contacts the pipe 7 are distended, as illustrated in dotted lines at 8, into sealing contact with the inner wall of the pipe. In the event that the pressure in the pipe between the stoppage and the bulb 10 is built up because of resistance of the stoppage to being dislodged, the greater pressure is transmitted back into the bulb through the opening 11 and is added to the original pressure which tends even more to provide a tight seal which prevents the escape of water between the bulb and the walls of the pipe.

In previously known devices similar in principle of operation to that shown herein, it has been found that water pressure insufficient to dislodge a stoppage in a pipe is frequently so great that the connection with the waste pipe is dislodged and the water under pressure is releasted at the open end of the waste pipe. In the present device, however, the design of the bulb-like member 10 is such that even a very low internal pressure will securely seal and fix it in position within the waste pipe so that no matter what internal pressure is applied the bulb will not be dislodged.

I claim:

In a device for cleaning waste lines, a member for forming a closure within the line and for forming a connection with a source of fluid under pressure, said member consisting of a resilient hollow bulb of substantially spherical but slightly elongated form having its greatest transverse diameter substantially the same as the interior diameter of the waste line to be cleaned, and a connection with an opening thereat forming communication between the interior of one end of said bulb and a source of fluid under pressure, said bulb having an opening in its opposite end at least as large as the opening at said connection.

PETE ROSA.